(12) United States Patent
Yano et al.

(10) Patent No.: US 7,466,382 B2
(45) Date of Patent: Dec. 16, 2008

(54) OPTICAL FILM AND IMAGE DISPLAY

(75) Inventors: Shuuji Yano, Ibaraki (JP); Ryouji Kinoshita, Ibaraki (JP); Masayuki Kawai, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 304 days.

(21) Appl. No.: 10/572,602

(22) PCT Filed: Sep. 13, 2004

(86) PCT No.: PCT/JP2004/013324

§ 371 (c)(1),
(2), (4) Date: Mar. 20, 2006

(87) PCT Pub. No.: WO2005/031407

PCT Pub. Date: Apr. 7, 2005

(65) Prior Publication Data

US 2007/0002228 A1 Jan. 4, 2007

(30) Foreign Application Priority Data

Sep. 25, 2003 (JP) ............................. 2003-333610

(51) Int. Cl.
*G02F 1/1335* (2006.01)
(52) U.S. Cl. .................... 349/118; 349/117; 349/119
(58) Field of Classification Search ................ 349/118, 349/119

See application file for complete search history.

(56) References Cited

U.S. PATENT DOCUMENTS 6,771,340 B1 8/2004 Yoshimi et al.
(Continued)

FOREIGN PATENT DOCUMENTS

CN 1374549 A 10/2002
(Continued)

OTHER PUBLICATIONS

International Search Report of PCT/JP2004/013324, dated Dec. 10, 2004.
(Continued)

*Primary Examiner*—Michael H Caley
(74) *Attorney, Agent, or Firm*—Westerman, Hattori, Daniels & Adrian, LLP.

(57) ABSTRACT

An optical film(3) of the invention comprises a polarizing plate(1) and plural retardation films(2) so that an absorption axis of the polarizing plate(1) is perpendicular or parallel to slow axes of the plural retardation films(2) and the slow axes of the plural retardation films(2) are parallel to one another. An Nz value expressed by $Nz=(nx_1-nz_1)/(nx_1-ny_1)$ is in the range of from 0.15 to 0.85 and an in-plane retardation $Re_1$ expressed by $Re_1=(nx_1-ny_1)\times d_1$ is in the range of from 200 to 350 nm, where in each of the plural retardation films, a direction along with the refractive index in the film plane is maximum is defined as the X-axis, a direction perpendicular to the X-axis as the Y-axis, the thickness direction of the film as the Z-axis, and where refractive indices in each axial direction are defined as $nx_1$, $ny_1$, and $nz_1$, respectively, and the thickness of the film as $d_1$ (nm). The optical film may realize an easily viewable display with high contrast ratio in a wide range.

24 Claims, 6 Drawing Sheets

U.S. PATENT DOCUMENTS 6,927,821 B2 8/2005 Yano et al.
6,967,637 B2 11/2005 Aoyama et al.

FOREIGN PATENT DOCUMENTS

| CN | 1403855 A | | 3/2003 |
|----|-----------|---|--------|
| JP | 4-305602 | | 10/1992 |
| JP | 4-371903 | | 12/1992 |
| JP | 2000-284124 | | 10/2000 |
| JP | 2001-350022 | | 12/2001 |
| JP | 2001350022 A | * | 12/2001 |
| JP | 2002-338703 | | 11/2002 |
| JP | 2002328224 A | * | 11/2002 |
| JP | 2003-240957 | | 8/2003 |
| KR | 2001-0021212 A | | 3/2001 |

OTHER PUBLICATIONS

International Preliminary Report on Patentability of Corresponding International Application No. PCT/JP2004/013324 mailed Apr. 6, 2006.

Office Action of Corresponding Korean Patent Application No. 10-2006-7003081 issued Dec. 15, 2006.

Office Action of Corresponding Chinese Patent Application No. 200480026915.4 issued Aug. 17, 2007.

* cited by examiner

OPTICAL FILM AND IMAGE DISPLAY

TECHNICAL FIELD

The present invention relates to an optical film in which a polarizing plate and plural retardation films are laminated. And the present invention relates to an image viewing display, such as a liquid crystal display, a PDP, and a CRT, using the above-mentioned optical film. Especially the optical film of the present invention is preferably used for a liquid crystal display operating in IPS mode.

BACKGROUND ART

Conventionally, as a liquid crystal display, there has been used a liquid crystal display in so-called TN mode in which a liquid crystal having a positive dielectric anisotropy is twisted and homogeneous aligned between substrates mutually facing to each other. However, in TN mode, even if black viewing is performed, optical leakage resulting from birefringence caused by liquid crystal molecule near a substrate made it difficult to obtain perfect black viewing owing to driving characteristics thereof. On the other hand, in a liquid crystal display in IPS mode, since liquid crystal molecule has almost parallel and homogeneous alignment to a substrate surface in non-driven state, light passes through the liquid crystal layer, without giving almost any change to a polarization plane, and as a result, arrangement of polarizing plates on upper and lower sides of the substrate enables almost perfect black viewing in non-driven state.

However, although almost perfect black viewing may be realized in normal direction to a panel in IPS mode, when a panel is observed in a direction shifted from normal direction, inevitable optical leakage occurs caused by characteristics of a polarizing plate in a direction shifted from an optical axis of the polarizing plates placed on upper and lower sides of the liquid crystal cell, as a result, leading to a problem of narrowing of a viewing angle.

In order to solve this problem, a polarizing plate is used in which the shift of a geometric axis of a polarizing plate given when observed from oblique direction is compensated by a retardation film. Polarizing plates providing such effect are disclosed in Japanese Patent Laid-Open Publication No. H4-305602, and Japanese Patent Laid-Open Publication No. H4-371903 official gazette. However, retardation films conventionally known have not been able to easily realize sufficient wide viewing angles.

In a polarizing plate described in the above-mentioned Japanese Patent Laid-Open Publication No. H4-305602, a retardation film is used as a protective film for a polarizer. However, although in the polarizing plate concerned viewing angle characteristics satisfactory in usual operating environment are obtained, protective film to which a polarizer is laminated is also deforms by dimensional variation of the polarizer under conditions of high temperature and high humidity. Thus, a retardation value of a retardation film used as a protective film would be shifted from a desired value, and a problem occurred that a stable effect could not be maintained.

On the other hand, in Japanese Patent Laid-Open Publication No. H4-371903, a retardation film is laminated to a polarizing plate in which a triacetyl cellulose film (TAC film) generally used as a protective film is applied. In this case, since a direct stress does not affect to a retardation film, a stable retardation value of the retardation film is obtained. However, a non-negligible retardation value of a TAC film makes design of a retardation film difficult that can compensate an axial shift. Moreover, a dimensional variation of a polarizer caused under conditions of high temperature or high humidity varies a retardation value of a TAC film as mentioned above, thus a desired purpose cannot be attained.

DISCLOSURE OF INVENTION

The present invention aims at providing an optical film with a retardation film and a polarizing plate laminated together that may realize an easily viewable display with high contrast ratio in a wide range when applied to an image viewing display.

Furthermore, the present invention aims at providing an optical film that may provide a retardation value stabilized under conditions of high temperature or high humidity.

Moreover, the present invention aims at providing an image viewing display, especially a liquid crystal display operating in IPS mode, which can realize an easily viewable display and has a high contrast ratio in a wide range using the above-mentioned optical film.

As a result of wholehearted examination to solve the above-mentioned problems conducted by the present inventors, an optical film described later was found out, and the present invention was completed.

That is, the present invention relates to an optical film in which a polarizing plate and plural retardation films are laminated so that an absorption axis of the polarizing plate is perpendicular or parallel to slow axes of the plural retardation films and the slow axes of the plural retardation films are parallel to one another, wherein an Nz value expressed by $Nz=(nx_1-nz_1)/(nx_1-ny_1)$ is in the range of from 0.15 to 0.85 and an in-plane retardation $Re_1$ expressed by $Re_1=(nx_1-ny_1) \times d_1$ is in the range of from 200 to 350 nm, where in each of the plural retardation films, a direction along with the refractive index in the film plane is maximum is defined as the X-axis, a direction perpendicular to the X-axis as the Y-axis, the thickness direction of the film as the Z-axis, and where refractive indices in each axial direction are defined as $nx_1$, $ny_1$, and $nz_1$, respectively, and the thickness of the film as $d_1$ (nm).

In the above-mentioned optical film of the present invention, when a polarizing plate is arranged in cross-Nicol state, the above-mentioned specific retardation film can solve optical leakage in a direction shifted from an optical axis. Especially, in a liquid crystal display in IPS mode, a function to compensate decrease in contrast in an oblique direction to a liquid crystal layer can be demonstrated. Besides since plural retardation films are laminated, the optical film can realize high contrast and can suppress a color shift so to be small. Each of plural retardation films has the Nz value in the range of from 0.15 to 0.85 and an in-plane retardation in the range of from 200 to 350 nm.

Preferably used is a retardation film with the Nz value in the range in order to enhance a compensating function for a contrast. In a case where two retardation films are employed as the plural retardation films, the invention is preferably embodied as described below in order to suppress a color shift so to be small.

For example, in a case a retardation film (a) and a retardation film (b) are laminated in this order from the polarizing plate side, and the absorption axis of the polarizing plate are parallel to the slow axes of the two retardation films, it is preferable that the retardation film (a) has an Nz value in the range of from 0.65 to 0.85 and the retardation film (b) has an Nz value in the range of from 0.15 to 0.35.

In a case the retardation film (b) and the retardation film (a) are laminated in this order from the polarizing plate side, and the absorption axis of the polarizing plate is perpendicular to the slow axes of the two retardation film, it is preferable that the retardation film (a) has an Nz value in the range of from 0.65 to 0.85 and the retardation film (b) has an Nz value in the range of from 0.15 to 0.35.

In the above embodiment, an Nz value of the retardation film (a) is more preferably in the range of from 0.7 to 0.8 and further more preferably in the range of from 0.72 to 0.78. Moreover, an Nz value of the retardation film (b) is more preferably in the range of from 0.2 to 0.3 and further more preferably in the range of from 0.22 to 0.28. In order to suppress a color shift so as to be small, the absolute value of a difference in Nz value between the retardation film (a) and the retardation film (b) is preferably in the range of from 0.4 to 0.6. Moreover, the absolute value of a difference in Nz value therebetween is more preferably in the range of from 0.45 to 0.55 and further more preferably in the range of from 0.48 to 0.52.

An in-plane retardation $Re_1$ is preferably 230 nm or more and more preferably 250 nm or more in order to enhance a compensating function for a contrast. On the other hand, an in-plane retardation $Re_1$ is preferably 300 nm or less and more preferably 280 nm or less. No specific limitation is placed on a thickness of each of the plural retardation films, but a thickness thereof is usually in the range of from about 40 to 100 μm and preferably in the range of from 50 to 70 μm.

The optical film is preferably a laminate in which the plural retardation films are laminated on one side of a polarizing plate obtained by laminating a transparent protective film on both sides of a polarizer so that the absorption axis of the polarizing plate is perpendicular or parallel to the slow axes of the plural retardation films and the slow axes of the plural retardation films are laminated so as to be parallel to one another.

In the above-mentioned optical film, the transparent protective film laminated on at least one side of the polarizing plate preferably comprises a thermoplastic resin (A) having a substituted and/or non-substituted imide group in a side chain and a thermoplastic resin (B) having a substituted and/or non-substituted phenyl group, and a nitrile group in a side chain.

A transparent film comprising a mixture of the above-mentioned thermoplastic resins (A) and (B) as principal components can provide a stable retardation value, even when a polarizer has some dimensional variation and, as a result, receives a stress caused by high temperature and high humidity under conditions of high temperature and high humidity. That is, an optical film that hardly gives retardation under high temperature and high humidity environment and gives little characteristic variation may be obtained.

In the above-mentioned optical film, an in-plane retardation $Re_2=(nx_2-ny_2) \times d_2$ is preferably 20 nm or less, and a thickness direction retardation $Rth=\{(nx_2+ny_2)/2-nz_2\} \times d_2$ is preferably 30 nm or less, where in the transparent protective film laminated on at least one side of the polarizing plate, a direction along with the refractive index in the film plane is maximum is defined as the X-axis, a direction perpendicular to the X-axis as the Y-axis, the thickness direction of the film as the Z-axis, and where refractive indices in each axial direction are defined as $nx_2$, $ny_2$, and $nz_2$, respectively, and the thickness of the film as $d_2$ (nm).

An in-plane retardation of a transparent protective film is preferably 20 nm or less, and more preferably 10 nm or less, and a thickness direction retardation is preferably 30 nm or less, and more preferably 20 nm or less. In this way, a remaining retardation adjusted small in a transparent protective film of a polarizer makes designing of a retardation film to be laminated easier, and as a result, an optical film is obtained that can demonstrate a high compensation effect by a retardation film. A thickness $d_2$ of the transparent protective film is not especially limited, and generally it is 500 μm or less, preferably 1 to 300 μm, and especially preferably 5 to 200 μm.

Moreover, in the above-mentioned optical film, the transparent protective film is preferably a film that is treated by stretching processing. Generally, strength of a film material can improve, and tougher mechanical characteristic can be realized if the film is stretched. In many materials, since stretching processing causes retardation, it cannot be used as a protective film for a polarizer. Even when stretching processing is given, a transparent film including a mixture of the thermoplastic resins (A) and (B) as principal components provide satisfactory in-plane retardation and a satisfactory thickness direction retardation described above. Stretching processing may be given by any of uniaxial stretching and biaxial stretching. Especially a film treated by biaxial stretching is preferable.

Furthermore, the present invention relates to an image viewing display characterized by using the above-mentioned optical film.

Moreover, the present invention relates to a liquid crystal display in IPS mode, wherein the above-mentioned optical film is arranged on a cell substrate in a viewing side, a polarizing plate comprising a transparent protective film laminated on both sides of a polarizer is arranged on a cell substrate opposite to the viewing side, and an extraordinary refractive index direction of a liquid crystalline substance in a liquid crystal cell, and an absorption axis of the polarizing plate are parallel, in a state that voltage is not applied.

And, the present invention relates to a liquid crystal display in IPS mode, wherein a polarizing plate comprising a transparent protective film laminated on both sides of a polarizer is arranged on a cell substrate on a viewing side, the above-mentioned optical film is arranged on a cell substrate opposite to the viewing side, and an extraordinary refractive index direction of a liquid crystalline substance in a liquid crystal cell and an absorption axis of the optical film are perpendicular, in a state where voltage is not applied.

In the above-mentioned liquid crystal display in IPS mode, the transparent protective film laminated on at least one side of the polarizing plate preferably comprises a thermoplastic resin (A) having a substituted and/or non-substituted imide group in a side chain, and a thermoplastic resin (B) having a substituted and/or non-substituted phenyl group, and a nitrile group in a side chain.

In the above-mentioned liquid crystal display in IPS mode, an in-plane retardation $Re_2=(nx_2-ny_2) \times d_2$ is 20 nm or less, and a thickness direction retardation $Rth=\{(nx_2+ny_2)/2-nz_2\} \times d_2$ is 30 nm or less, where in the transparent protective film laminated on at least one side of the polarizing plate, a direction along with the refractive index in the film plane is maximum is defined as the X-axis, a direction perpendicular to the X-axis as the Y-axis, the thickness direction of the film as the Z-axis, and where refractive indices in each axial direction are defined as $nx_2$, $ny_2$, and $nz_2$, respectively, and the thickness of the film as $d_2$ (nm).

In the above-mentioned liquid crystal display in IPS mode, the transparent protective film is preferably a film that is treated by biaxial stretching.

As the image viewing display of the present invention, a liquid crystal display in IPS mode is suitable. When the above-mentioned optical film of the invention in which the polarizing plate and plural retardation films having a specific retardation value are laminated is arranged on at least one side of a liquid crystal cells in IPS mode, optical leakage at the time of black viewing conventionally occurred in a liquid crystal display in IPS mode can be reduced. This type of liquid crystal display in IPS mode has a high contrast ratio over all directions, and can realize easily viewable display with a wide viewing angle.

Especially, when a transparent protective film comprising the above-mentioned mixture of thermoplastic resins (A) and (B) as principal components is used as the above-mentioned transparent protective film of the polarizing plate arranged on a liquid crystal cell surface, a liquid crystal display that has a wide viewing angle and secure a stable retardation may suitably be obtained.

BEST MODE FOR CARRYING OUT THE INVENTION

Figure 1A:
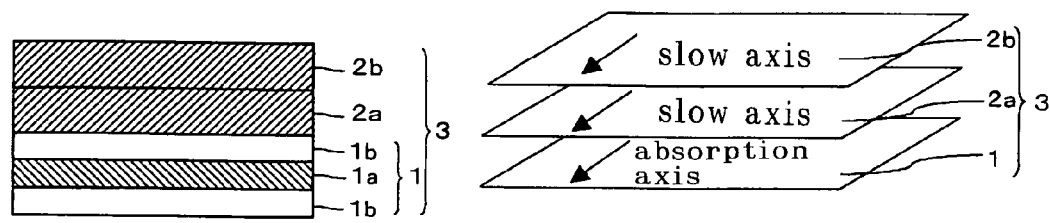
FIG. 1(A) is an example of a sectional view of an optical film of the invention.
Figure 1B:
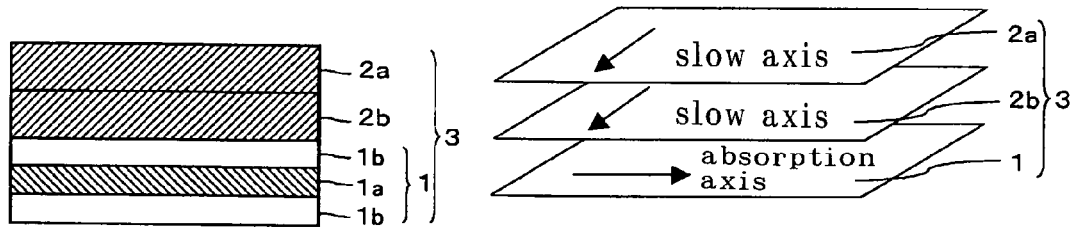
FIG. 1(B) is an example of a sectional view of an optical film of the invention.

Description will be given of an optical film and an image viewing display of the invention with reference to the accompanying drawings. An optical film of the invention has a polarizing plate and plural retardation films. FIGS. 1(A) and 1(B) are examples of a case where two retardation films 2 are laminated from a polarizing plate 1 side. Used as a polarizing plate is a polarizer as is or a transparent protective film laminated on a polarizer. In FIGS. 1(A) and 1(B), used is the polarizing plate 1 obtained by laminating the transparent protective films 1$b$ on both sides of a polarizer 1$a$. In FIG. 1(A), there is shown an example of a case where the two retardation films 2$a$ and 2$b$ are laminated in this order on one side of the polarizing plate 1. In FIG. 1(A), the polarizing plate 1 and the two retardation films 2$a$ and 2$b$ are laminated so that the absorption axis of the polarizing plate 1 is parallel to the slow axes of the retardation films 2$a$ and 2$b$. In FIG. 1(B), there is shown an example of a case where the two retardation films 2$b$ and 2$a$ are laminated in this order on one side of the polarizing plate 1. In FIG. 1(B), the polarizing plate 1 and the two retardation films 2$b$ and 2$a$ are laminated so that the absorption axis of the polarizing plate 1 is perpendicular to the slow axes of the retardation films 2$b$ and 2$a$. The retardation films 2 are preferably laminated on the polarizing plate 1 so that the absorption axis of the polarizing plate 1 is parallel to the slow axes of the retardation films 2 in consideration of a continuous adhesion step in lamination. The retardation films 2$a$ and 2$b$ have Nz values in the range of from 0.15 to 0.85 and in-plane retardations $Re_1$ in the range of from 200 to 350 nm without imposing specific limitation thereon, but it is preferable to use the retardation film 2$a$ having an Nz value in the range of from 0.65 to 0.85 and the retardation film 2$b$ having an Nz value in the range of from 0.15 to 0.35.

As a retardation film, a film satisfying the above-mentioned Nz value and in-plane retardation $Re_1$ can be used without any limitation. For example, a polymer film showing birefringence, and an oriented liquid crystal polymer film etc. may be mentioned.

Among polymers are, for example: polycarbonate; polyolefins, such as and polypropylene; polyesters, such as polyethylene terephthalate and polyethylenenaphthalate; cycloaliphatic polyolefins, such as poly norbornene etc.; polyvinyl alcohols; polyvinyl butyrals; polymethyl vinyl ethers; poly hydroxyethyl acrylates; hydroxyethyl celluloses; hydroxypropyl celluloses; methylcelluloses; polyarylates; polysulfones; polyether sulfones; polyphenylene sulfides; polyphenylene oxides; poly aryl sulfones; polyvinyl alcohols; polyamides; polyimides; polyvinyl chlorides; cellulose based polymers; or various kinds of binary copolymers; ternary copolymers; and graft copolymers of the above-mentioned polymers; or their blended materials. A retardation film may be obtained by adjusting a refractive index in a thickness direction using a method in which a polymer film is biaxially stretched in a planar direction, or a method in which a polymer film is uniaxially or biaxially stretched in a planar direction, and also stretched in a thickness direction etc. And a retardation film may be obtained using, for example, a method in which a heat shrinking film is adhered to a polymer film, and then the combined film is stretched and/or shrunken under a condition of being influenced by a shrinking force to obtain tilted orientation.

As liquid crystalline polymers, for example, various kinds of principal chain type or side chain type polymers may be mentioned in which conjugated linear atomic groups (mesogen) demonstrating liquid crystal alignment property are introduced into a principal chain and a side chain of the polymer. As illustrative examples of principal chain type liquid crystalline polymers, for example, nematic orientated polyester based liquid crystalline polymers having a structure where mesogenic group is bonded by a spacer section giving flexibility, discotic polymers, and cholesteric polymers, etc. may be mentioned. As illustrative examples of side chain type liquid crystalline polymers, there may be mentioned a polymer having polysiloxanes, polyacrylates, polymethacrylates, or poly malonates as a principal chain skeleton, and having a mesogen section including a para-substituted cyclic compound unit giving nematic orientation through a spacer section comprising conjugated atomic group as side chain. As preferable examples of oriented films obtained from these liquid crystalline polymers, there may be mentioned a film whose surface of a thin film made of polyimide or polyvinyl alcohol etc. formed on a glass plate is treated by rubbing, and a film obtained in a method that a solution of a liquid crystalline polymer is applied on an oriented surface of a film having silicon oxide layer vapor-deposited by an oblique vapor deposition method and subsequently the film is heat-treated to give orientation of the liquid crystal polymer, and among them, a film given tilted orientation is especially preferable.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type orientation films, such as dehydrated polyvinyl alcohol and dehydrochlorinated polyvinyl chloride, etc. may be mentioned. In these, a polyvinyl alcohol type film on which dichromatic materials such as iodine etc., is absorbed and oriented after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

Materials forming a transparent protective film provided in the above-mentioned polarizer are not especially limited, and materials comprising a thermoplastic resin (A) having a substituted and/or non-substituted imide group in a side chain, and a thermoplastic resin (B) having substituted and/or non-substituted phenyl group, and nitrile group in a side chain may be preferably used. The transparent protective film comprising the thermoplastic resins (A) and (B) hardly gives retardation, when the film is affected by a stress caused by dimensional variation of the polarizer, and consequently, when stretching processing is given, an in-plane retardation $Re_2$ and a thickness direction retardation Rth can be controlled small. Transparent protective films comprising the thermoplastic resins (A) and (B) are described in, for example, WO 01/37007. In addition, the transparent protective film may also comprise other resins, when it comprises thermoplastic resins (A) and (B) as principal components.

The thermoplastic resin (A) has substituted and/or non-substituted imide group in a side chain, and a principal chain may be of arbitrary thermoplastic resins. The principal chain may be, for example, of a principal chain consisting only of carbon atoms, or otherwise atoms other than carbon atoms may also be inserted between carbon atoms. And it may also comprise atoms other than carbon atoms. The principal chain is preferably of hydrocarbons or of substitution products thereof. The principal chain may be, for example, obtained by an addition polymerization. Among concrete examples are polyolefins and polyvinyls. And the principal chain may also be obtained by a condensation polymerization. It may be obtained by, for example, ester bonds, amide bonds, etc. The principal chain is preferably of polyvinyl skeletons obtained by polymerization of substituted vinyl monomers.

As methods for introducing substituted and/or non-substituted imide group into the thermoplastic resin (A), well-known conventional and arbitrary methods may be employed. As examples for those methods, there may be mentioned a method in which monomers having the above-mentioned imide group are polymerized, a method in which the above-mentioned imide group is introduced after a principal chain is formed by polymerization of various monomers, and a method in which compounds having the above-mentioned imide group is grafted to a side chain. As substituents for imide group, well-known conventional substituents that can substitute a hydrogen atom of the imide group may be used. For example, alkyl groups, etc. may be mentioned as examples.

The thermoplastic resin (A) is preferably of two or more component copolymers including a repeating unit induced from at least one kind of olefin, and a repeating unit having at least one kind of substituted and/or non-substituted maleimide structure. The above-mentioned olefin-maleimide copolymers may be synthesized from olefins and maleimide compounds using well-known methods. The synthetic process is described in, for example, Japanese Patent Laid-Open Publication No. H5-59193, Japanese Patent Laid-Open Publication No. H5-195801, Japanese Patent Laid-Open Publication No. H6-136058, and Japanese Patent Laid-Open Publication No. H9-328523 official gazettes.

As olefins, for example, there may be mentioned, isobutene, 2-methyl-1-butene, 2-methyl-1-pentene, 2-methyl-1-hexene, 2-methyl-1-heptene, 1-iso octene, 2-methyl-1-octene, 2-ethyl-1-pentene, 2-ethyl-2-butene, 2-methyl-2-pentene, and 2-methyl-2-hexene etc. Among them, isobutene is preferable. These olefins may be used independently and two or more kinds may be used in combination.

As maleimide compounds, there may be mentioned, maleimide, N-methyl maleimide, N-ethylmaleimide, N-n-propyl maleimide, N-i-propyl maleimide, N-n-butyl maleimide, N-s-butyl maleimide, N-t-butyl maleimide, N-n-pentyl maleimide, N-n-hexyl maleimide, N-n-heptyl maleimide, N-n-octyl maleimide, N-lauryl maleimide, N-stearyl maleimide, N-cyclopropyl maleimide, N-cyclobutyl maleimide, N-cyclopentyl maleimide, N-cyclohexyl maleimide, N-cycloheptyl maleimide, and N-cyclooctyl maleimide, etc. Among them N-methyl maleimide is preferable. These maleimide compounds may be used independently and two or more kinds may be used in combination.

A content of repeating units of olefin in the olefin-maleimide copolymer is not especially limited, and it is approximately 20 to 70 mole % in all of repeating units in the thermoplastic resin (A), preferably 40 to 60 mole %, and more preferably 45 to 55 mole %. A content of repeating units of maleimide structure is approximately 30 to 80 mole %, preferably 40 to 60 mole %, and more preferably 45 to 55 mole %.

The thermoplastic resin (A) may comprise repeating units of the above-mentioned olefin, and repeating units of maleimide structure, and it may be formed only of these units. And in addition to the above constitution, other vinyl based monomeric repeating units may be included at a percentage of 50 mole % or less. As other vinyl based monomers, there may be mentioned, acrylic acid based monomers, such as methyl acrylate and butyl acrylate; methacrylic acid based monomers, such as methyl methacrylate and cyclo hexyl methacrylate; vinyl ester monomers, such as vinyl acetate; vinyl ether monomers, such as methyl vinyl ether; acid anhydrides, such as maleic anhydride; styrene based monomers, such as styrene, α-methyl styrene, and p-methoxy styrene etc.

A weight average molecular weight of the thermoplastic resin (A) is not especially limited, and it is approximately $1\times10^3$ to $5\times10^6$. The above-mentioned weight average molecular weight is preferably $1\times10^4$ or more and $5\times10^5$ or more. A glass transition temperature of the thermoplastic resin (A) is 80° C. or more, preferably 100° C. or more, and more preferably 130° C. or more.

And glutar imide based thermoplastic resins may be used as the thermoplastic resin (A). Glutar imide based resins are described in Japanese Patent Laid-Open Publication No. H2-153904 etc. Glutar imide based resins have glutar imide structural units and methyl acrylate or methyl methacrylate structural units. The above-mentioned other vinyl based monomers may be introduced also into the glutar imide based resins.

The thermoplastic resin (B) is a thermoplastic resin having substituted and/or non-substituted phenyl group, and nitrile group in a side chain. As a principal chain of the thermoplastic resin (B), similar principal chains as of the thermoplastic resin (A) may be illustrated.

As a method of introducing the above-mentioned phenyl group into the thermoplastic resin (B), for example, there may be mentioned a method in which monomers having the above-mentioned phenyl group is polymerized, a method in which phenyl group is introduced after various monomers are polymerized to form a principal chain, and a method in which compounds having phenyl group are grafted into a side chain, etc. As substituents for phenyl group, well-known conventional substituents that can substitute a hydrogen atom of the phenyl group may be used. For example, alkyl groups, etc. may be mentioned as examples. As method for introducing nitrile groups into the thermoplastic resin (B), similar methods for introducing phenyl groups may be adopted.

The thermoplastic resin (B) is preferably of two or more components copolymers comprising repeating unit (nitrile unit) induced from unsaturated nitrile compounds, and repeating unit (styrene based unit) induced from styrene based compounds. For example, acrylonitrile styrene based copolymers may preferably be used.

As unsaturated nitrile compounds, arbitrary compounds having cyano groups and reactive double bonds may be mentioned. For example, acrylonitrile, α-substituted unsaturated nitrites, such as methacrylonitrile, nitrile compounds having has α- and β-disubstituted olefin based unsaturated bond, such as fumaronitrile may be mentioned.

As styrene based compound, arbitrary compounds having a phenyl group and a reactive double bond may be mentioned. For example, there may be mentioned, non-substituted or substituted styrene based compounds, such as styrene, vinyltoluene, methoxy styrene, and chloro styrene; α-substituted styrene based compounds, such as α-methyl styrene.

A content of a nitrile unit in the thermoplastic resin (B) is not especially limited, and it is approximately 10 to 70% by weight on the basis of all repeating units, preferably 20 to 60% by weight, and more preferably 20 to 50% by weight. It is further preferably 20 to 40% by weight, and still further preferably 20 to 30% by weight. A content of a styrene based unit is approximately 30 to 80% by weight, preferably 40 to 80% by weight, and more preferably 50 to 80% by weight. It is especially 60 to 80% by weight, and further preferably 70 to 80% by weight.

The thermoplastic resin (B) may comprise repeating units of the above-mentioned nitrites, and styrene based repeating units, and it may be formed only of these units. And in addition to the above constitution, other vinyl based monomeric repeating units may be included at a percentage of 50 mole % or less. As other vinyl based monomers, compounds, repeating units of olefins, repeating units of maleimide and substituted maleimides, etc. may be mentioned, which were illustrated in the case of thermoplastic resin (A). As the thermoplastic resins (B), AS resins, ABS resins, ASA resins, etc. may be mentioned.

A weight average molecular weight of the thermoplastic resin (B) is not especially limited, and it is approximately $1\times10^3$ to $5\times10^6$. It is preferably $1\times10^4$ or more, and $5\times10^5$ or less.

A compounding ratio of the thermoplastic resin (A) and the thermoplastic resin (B) is adjusted depending on a retardation required for a transparent protective film. In the above-mentioned compounding ratio, in general, a content of the thermoplastic resin (A) is preferably 50 to 95% by weight in total amount of a resin in a film, more preferably 60 to 95% by weight, and still more preferably 65 to 90% by weight. A content of the thermoplastic resin (B) is preferably 5 to 50% by weight in total amount of the resin in the film, more preferably 5 to 40% by weight, and still more preferably 10 to 35% by weight. The thermoplastic resin (A) and the thermoplastic resin (B) are mixed using a method in which these are kneaded in thermally molten state.

Preferably used as a transparent protective film used for a polarizer can be a film comprising a thermoplastic resin (A) having a substituted and/or non-substituted imide group in a side chain and a thermoplastic resin (B) having substituted and/or non-substituted phenyl group, and nitrile group in a side chain. Transparent protective films using the materials can be laminated on both sides of a polarizer, and besides, another construction can be adopted in which a transparent protective film comprising the materials is used on one side of a polarizer while a transparent protective film made of a material other than the materials is used on the other surface of the polarizer. Moreover, transparent protective films made of a material other than the materials can be laminated on both sides of a polarizer. In an optical film of the invention, a construction is more preferably adopted in which a retardation film is laminated on the side of a transparent protective film comprising a thermoplastic resin (A) having a substituted and/or non-substituted imide group in a side chain and a thermoplastic resin (B) having substituted and/or non-substituted phenyl group, and nitrile group in a side chain, which is exemplified above. With such a construction adopted, in-plane unevenness can be reduced in black viewing.

As a material other than forming the above transparent protective film, with outstanding transparency, mechanical strength, heat stability, moisture cover property, isotropy, etc. may be preferable. For example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a transparent protective film, polyolefin type polymers, such as polyethylene, polypropylene, polyolefin that has cyclo- type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; arylate type polymers; polyoxymethylene type polymers; epoxy type polymers; or blend polymers of the above-mentioned polymers may be mentioned. In addition, a film comprising resins of heat curing type or ultraviolet curing type, such as acrylics type, urethane type, acrylics urethane type and epoxy type and silicone type may be mentioned.

As the opposite side of the polarizing-adhering surface above-mentioned transparent protective film, a film with a hard coat layer and various processing aiming for antireflection, sticking prevention and diffusion or anti glare may be used.

A hard coat processing is applied for the purpose of protecting the surface of the polarizing plate from damage, and this hard coat film may be formed by a method in which, for example, a curable coated film with excellent hardness, slide property etc. is added on the surface of the transparent protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the transparent protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 µm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight parts to the transparent resin 100 weight parts that forms the fine concavo-convex structure on the surface, and preferably 5 to 25 weight parts. An anti glare layer may serve as a diffusion layer (viewing angle expanding function etc.) for diffusing transmitting light to the polarizing plate and expanding a viewing angle etc.

In addition, the above-mentioned antireflection layer, sticking prevention layer, diffusion layer, anti glare layer, etc. may be built in the transparent protective film itself, and also they may be prepared as an optical layer different from the transparent protective film.

Isocyanate based adhesives, polyvinyl alcohol based adhesives, gelatin based adhesives, vinyl based latex based, aqueous polyester based adhesives, and etc. may be used for adhesion processing for the above-mentioned polarizers and transparent protective films.

A laminating method for the above-mentioned retardation films and polarizing plates is not especially limited, and lamination may be carried out using pressure sensitive adhesive layers etc. As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

In addition, in the present invention, ultraviolet absorbing property may be given to the above-mentioned each layer, such as an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

An optical film of the present invention is suitably used for a liquid crystal display in IPS mode. A liquid crystal display in IPS mode has a liquid crystal cell comprising: a pair of substrates sandwiching a liquid crystal layer; a group of electrodes formed on one of the above-mentioned pair of substrates; a liquid crystal composition material layer having dielectric anisotropy sandwiched between the above-mentioned substrates; an alignment controlling layer that is formed on each of surfaces, facing each other, of the above-mentioned pair of substrates in order to align molecules of the above-mentioned liquid crystal composition material in a predetermined direction, and driving means for applying driver voltage to the above-mentioned group of electrodes. The above-mentioned group of electrodes has alignment structure arranged so that parallel electric field may mainly be applied to an interface to the above-mentioned alignment controlling layer and the above-mentioned liquid crystal composition material layer.

Figure 2:
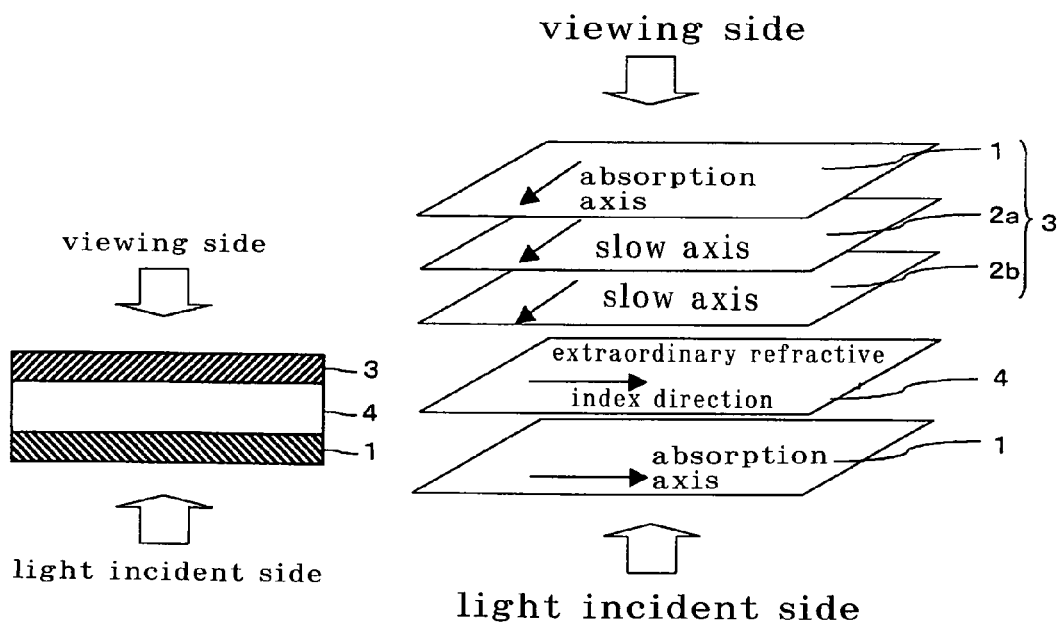
FIG. 2 is an example of a conceptual view of a liquid crystal display.
Figure 3:
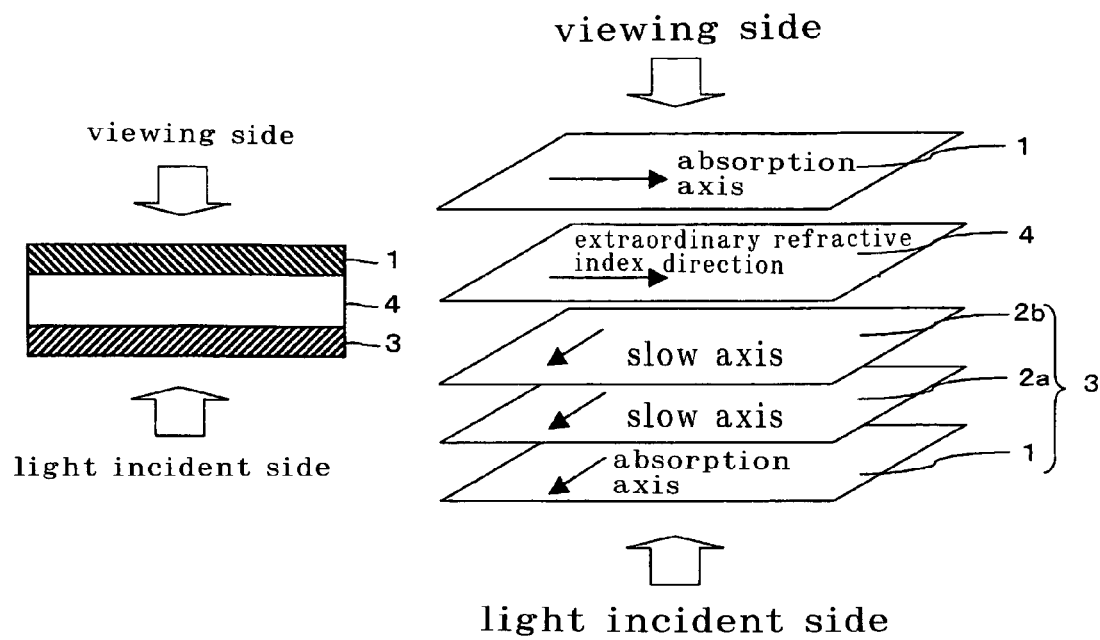
FIG. 3 is an example of a conceptual view of a liquid crystal display.

As is shown in FIG. 2 and FIG. 3, an optical film 3 of the present invention is arranged on a viewing side or on a light incident side of a liquid crystal cell. FIG. 2 and FIG. 3 are cases using the optical film 3 exemplified in FIG. 1(A). For the optical film 3, it is preferable that a retardation film 2 side is arranged to face to a liquid crystal cell 4 side. A polarizing plate 1 is arranged on an opposite side of the liquid crystal cell 4 to which the optical film 3 is arranged. Absorption axes of the polarizing plate 1 and the optical film 3 (the polarizing plate 1), which are arranged on substrates both sides of the liquid crystal cell 4, are arranged so as to be perpendicular to each other. In the polarizing plate 1, a constitution is used that a transparent protective film 1*b* is laminated on both sides of a similar polarizer 1*a* as a polarizer used for the optical film 3.

As is shown in FIG. 2, when the optical film 3 is arranged on a viewing side of the liquid crystal cell 4 in IPS mode, on a substrate of the liquid crystal cell 4 opposite to the viewing side (a light incident side), the polarizing plate 1 is preferably arranged so that an extraordinary refractive index direction of a liquid crystalline substance in the liquid crystal cell 4 and an absorption axis of the polarizing plate 1 are parallel in a state where voltage is not applied.

Moreover as is shown in FIG. 3, when the optical film 3 is arranged on a light incident side of the liquid crystal cell 4 in IPS mode, a polarizing plate 1 is preferably arranged on a substrate of the liquid crystal 4 in a viewing side so that an extraordinary refractive index direction of a liquid crystalline substance in the liquid crystal cell 4 and an absorption axis of the optical film 3 (polarizing plate 1) are perpendicular to each other in a state where voltage is not applied.

The above-mentioned optical film and polarizing plate may be used in a state where other optical films are laminated thereto on the occasion of practical use. The optical films used here are not especially limited, and, for example, one layer or two or more layers of optical films that may be used for formation of liquid crystal displays, such as reflectors, semi-transparent plates, and retardation plates (including half wavelength plates and quarter wavelength plates etc.) may be used. Especially, a reflection type polarizing plate or a semi-transparent type polarizing plate in which a reflector or a semitransparent reflector is further laminated to a polarizing plate, and a polarizing plate in which a brightness enhancement film is further laminated to a polarizing plate are preferable.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective layer etc.

As an example of a reflection type polarizing plate, a plate may be mentioned on which, if required, a reflective layer is formed using a method of attaching a foil and vapor deposition film of reflective metals, such as aluminum, to one side of a matte treated transparent protective film. Moreover, a different type of plate with a fine concavo-convex structure on the surface obtained by mixing fine particle into the above-mentioned transparent protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the transparent protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a transparent protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the transparent protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a transparent protective film or a polarizing plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

The polarizing plate on which the retardation plate is laminated may be used as elliptically polarizing plate or circularly polarizing plate. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called $\lambda/4$ plate) is used. Usually, half-wavelength plate (also called $\lambda/2$ plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection.

The polarizing plate with which a polarizing plate and a brightness enhancement film are adhered together is usually used being prepared in a backside of a liquid crystal cell. A brightness enhancement film shows a characteristic that reflects linearly polarized light with a predetermined polarization axis, or circularly polarized light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy (D-BEF and others manufactured by 3M Co., Ltd.); an oriented film of cholesteric liquid-crystal polymer; a film that has the characteristics of reflecting a circularly polarized light with either left-handed or right-handed rotation and transmitting other light, such as a film on which the oriented cholesteric liquid crystal layer is supported (PCF350 manufactured by NITTO DENKO CORPORATION, Transmax manufactured by Merck Co., Ltd., and others); etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a transflective type polarizing plate is combined with above described retardation plate respectively.

Although optical films and polarizing plates having the above-mentioned optical films laminated thereto may be formed using methods in which they are laminated sequentially and separately in a manufacturing process of liquid crystal displays, films that are beforehand laminated and constituted as an optical film are superior in stability of quality, assembly work, etc., thus leading to advantages of improved manufacturing processes for liquid crystal displays. Suitable adhering means, such as adhesive layer, may be used for lamination for layers. In adhesion of the above-mentioned polarizing plate and other optical films, the optical axes may be arranged so that they have proper arrangement angles based on desired retardation characteristics etc.

Formation of a liquid crystal display may be carried out according to conventional methods. A liquid crystal display is generally formed using methods in which component parts, such as lighting systems, are suitably assembled, and driving circuits are subsequently incorporated, if necessary, and the present invention is not especially limited except that the above-mentioned optical film is used, and any methods according to conventional methods may be adopted. Also in liquid crystal cells, for example, liquid crystal cells of arbitrary type, such as VA type and $\pi$ type, other than IPS mode type illustrated above may be used.

As liquid crystal displays, suitable liquid crystal displays, such as types using lighting systems or reflectors, may be formed. Furthermore, on the occasion of formation of liquid crystal displays, one layer of two or more layers of suitable parts, such as diffusion plates, anti-glare layer coatings, protective plates, prism arrays, lens array sheets, optical diffusion plates, and backlights, may be arranged in suitable position.

EXAMPLES

Although the present invention will hereinafter be described in detail with reference to Examples, the present invention is not limited by the Examples.

Refractive indices nx, ny, and nz of a retardation film were measured by an automatic birefringence measuring apparatus (manufactured by Oji Scientific Instruments KOBRA21ADH) to calculate an Nz and an in-plane retardation $Re_1$. And, similar measurement was carried out also for a transparent protective film, and an in-plane retardation $Re_2$ and a thickness direction retardation Rth were calculated.

Example 1

(Transparent Protective Film)

An alternating copolymer consisting of isobutene and N-methyl maleimide (N-methyl maleimide contents 50 mole %) 75 parts by weight, and an acrylonitrile-styrene copolymer having content of 28% by weight of acrylonitrile 25 parts by weight were dissolved in methylene chloride to obtain a solution having 15% by weight of solid content concentration. After this solution was poured on a polyethylene terephthalate film lay to cover a glass plate and was left at room temperature for 60 minutes, dried film was removed from the film concerned. The film obtained was dried for 10 minutes at 100° C., for 10 minutes at 140° C., and further for 30 minutes at 160° C. to obtain a transparent protective film having a thickness of 100 μm. The transparent protective film thus obtained showed an in-plane retardation $Re_2$ of 4 nm and thickness direction retardation Rth of 4 nm.

(Polarizing Plate)

The above-mentioned transparent protective film was laminated to both sides of a film (polarizer: 20 μm), in which iodine was absorbed to a poly vinylalcohol based film and was subsequently stretched, using an adhesive to produce a polarizing plate.

(Retardation Film)

The following two kinds of retardation films (a) and (b) were produced by stretching a polycarbonate film. The retardation film (a) had a thickness of 65 μm, an in-plane retardation $Re_1$ of 260 nm and an Nz of 0.75. The retardation film (b) had a thickness of 65 μm, an in-plane retardation $Re_1$ of 260 nm and an Nz of 0.25.

(Optical Film)

An optical film was produced by laminating the retardation film (a) and the retardation film (b) in this order from the polarizing plate side so that the absorption axis of the polarizing plate was parallel to the slow axes of the retardation films using a pressure sensitive adhesive.

(Liquid Crystal Display)

As is shown in FIG. 2, the optical film was laminated on a face of a viewing side of a liquid crystal cell in IPS mode so that a retardation film (b) side of the optical film was face to the viewing side, using a pressure sensitive adhesive. On the other hand, the polarizing plate was laminated to a side opposite to the liquid crystal cell using a pressure sensitive adhesive to produce a liquid crystal display. The polarizing plate on a viewing side was laminated so that an extraordinary refractive index direction of a liquid crystalline composition in the liquid crystal cell and an absorption axis of the polarizing plate were perpendicular to each other when voltage was not applied. And the absorption axis of the polarizing plate and an absorption axis of the optical film were arranged so that they were perpendicular to each other.

(Evaluation)

Figure 4:
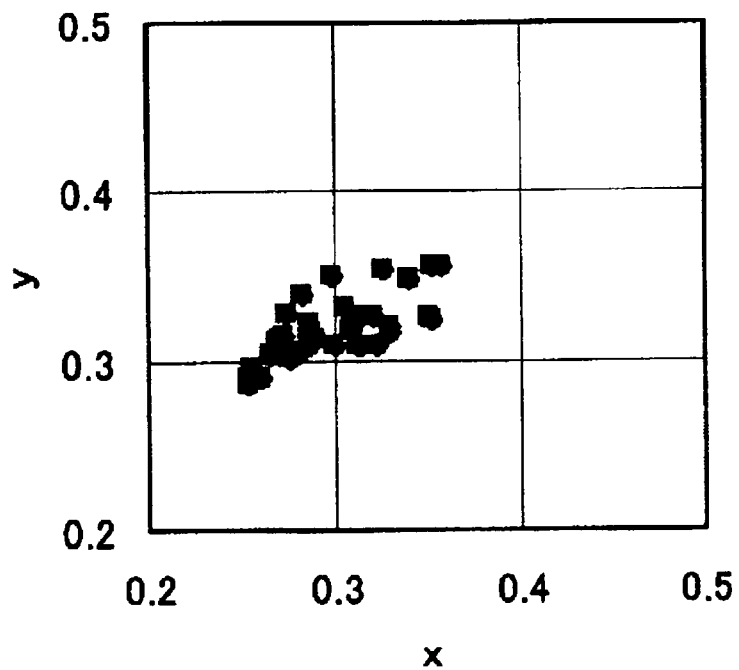
FIG. 4 is a graph showing a color shift of Example 1.

In this liquid crystal display, a contrast ratio in a direction of gradient to make 70 degree from normal was measured in a direction to make an angle of 45 degrees to optical axes perpendicular to each other of polarizing plates to obtain a contrast ratio of 50. FIG. 4 shows a small color shift and excellent optical characteristics. Measurement of the contrast ratio was carried out using EZ Contrast (product manufactured by ELDIM). And, after this liquid crystal display was maintained under condition of 60° C. and 95% RH for 200 hours, irregularity within a surface of black viewing was confirmed by visual viewing, and irregularity was hardly observed.

Example 2

A transparent protective film produced by a similar method as in Example 1 was stretched 1.5 times at 160° C. in an MD direction, and, subsequently stretched 1.5 times at 160° C. in a TD direction. This stretched film showed a thickness of 45 μm, an in-plane retardation $Re_2$ of 4 nm, and a thickness direction retardation Rth of 12 nm.

Figure 5:
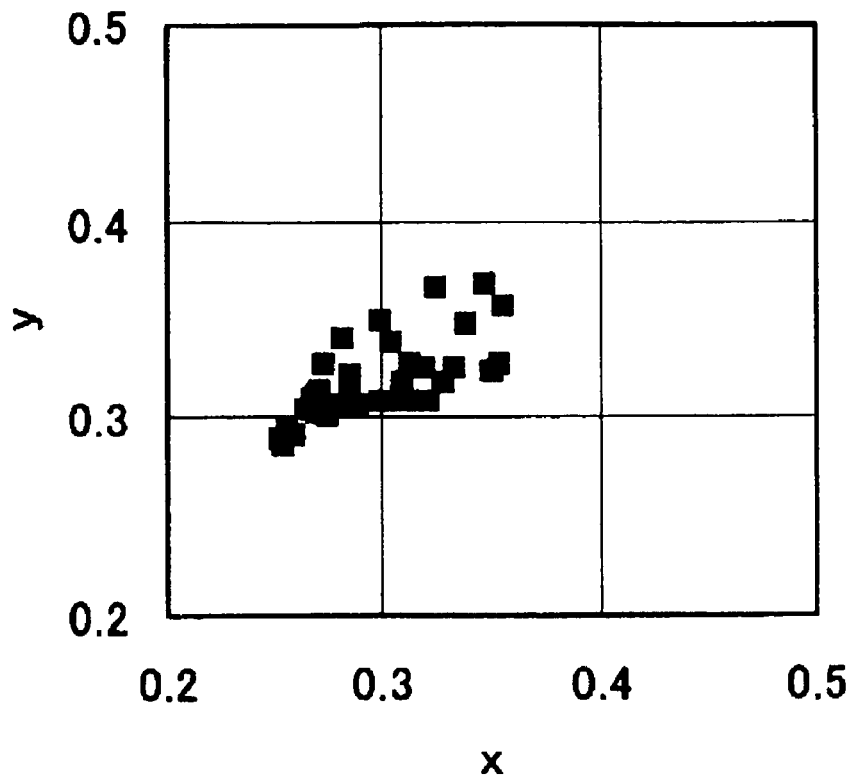
FIG. 5 is a graph showing a color shift of Example 2.

Except that this transparent protective film was used, similar method as in Example 1 was repeated, and a polarizing plate and an optical film were produced. And, similar method as in Example was repeated to produce a liquid crystal display. In this liquid crystal display, a contrast ratio in a direction of gradient to make 70 degree from normal was measured in a direction to make an angle of 45 degrees to optical axes perpendicular to each other of polarizing plates to obtain a contrast ratio of 40. FIG. 5 shows a small color shift and excellent optical characteristics. And, after this liquid crystal display was maintained under condition of 60° C. and 95% RH for 200 hours, irregularity within a surface of black viewing was confirmed by visual viewing, and irregularity was hardly observed.

Example 3

The two kind of retardation films (a) and (b) made of polycarbonate produced in Example 1 were directly laminated to a polarizer in the order of the retardation film (a) and the retardation film (b) so that the slow axes were parallel to the absorption axis of the polarizer to produce the optical film. Thus obtained optical film was laminated using a pressure sensitive adhesive so that a retardation film side was arranged on a face of a viewing side of a liquid crystal cell in IPS mode. On the other hand, a polarizing plate used in Example 1 was laminated to an opposite side using a pressure sensitive adhesive to produce a liquid crystal display.

Figure 6:
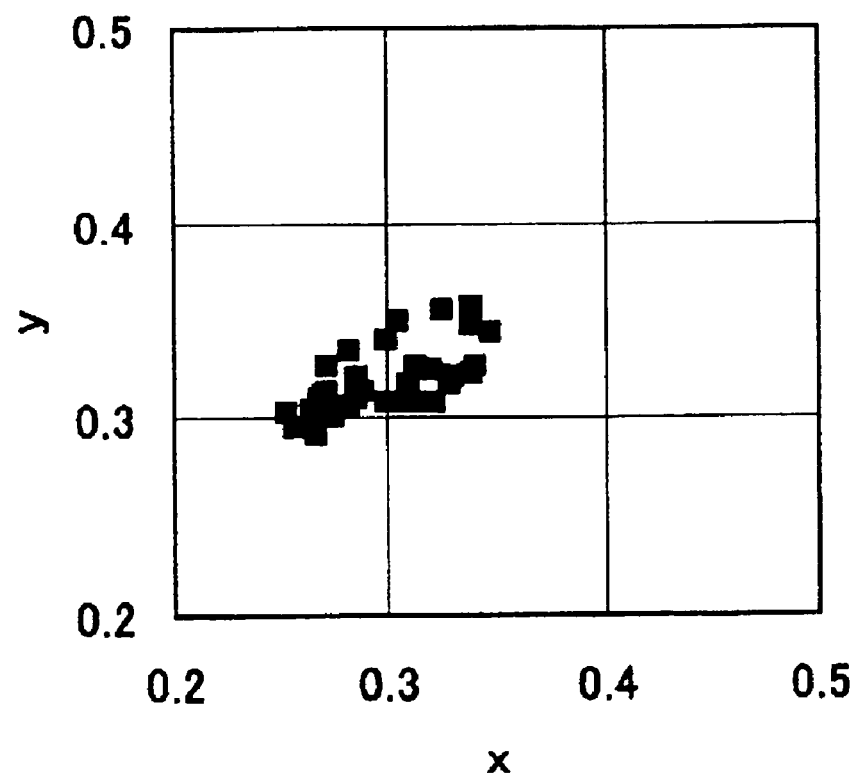
FIG. 6 is a graph showing a color shift of Example 3.

In this liquid crystal display, a contrast ratio in a direction of gradient to make 70 degree from normal was measured in a direction to make an angle of 45 degrees to optical axes perpendicular to each other of polarizing plates to obtain a contrast ratio of 50. FIG. 6 shows a small color shift and excellent optical characteristics. And, after this liquid crystal display was maintained under condition of 60° C. and 95% RH for 200 hours, irregularity within a surface of black viewing was confirmed by visual viewing, and irregularity by variation of a retardation value of the retardation film caused by shrinkage of the polarizing plate was observed.

Example 4

(Transparent Protective Film)

A glutar imide copolymer consisting of N-methyl glutar imide and metyl methacrylate (N-methyl glutar imide contents 75% by weight and acid contents 0.01 milli equivalent/g or less, glass transition temperature 147° C.) 65 parts by weight, and an acrylonitrile-styrene copolymer having content of 28% by weight of acrylonitrile and 72% by weight of styrene 35 parts by weight were melt and mixed together to obtain a resin composition. The resin composition was fed to T dice type extruder to obtain a transparent protective film having a thickness of 135 μm. The film was stretched 1.7 times at 160° C. in an MD direction, and, subsequently stretched 1.8 times at 160° C. in a TD direction. This biaxially stretched film showed a thickness of 55 µm, an in-plane retardation $Re_2$ of 1 nm, and a thickness direction retardation Rth of 3 nm.

Figure 7:
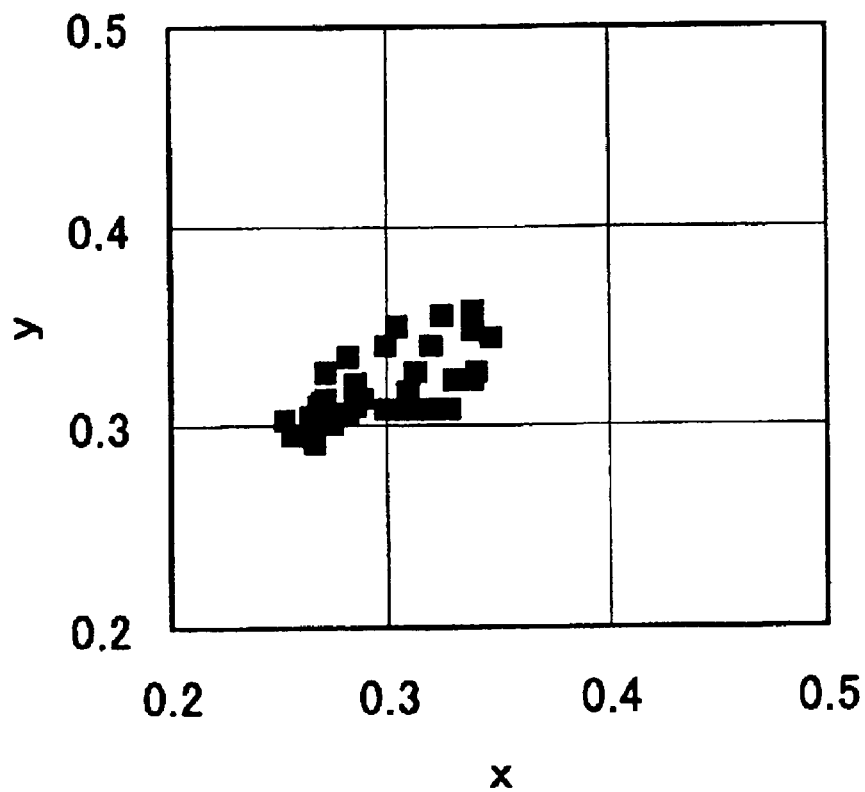
FIG. 7 is a graph showing a color shift of Example 4.

Except that this transparent protective film was used, similar method as in Example 1 was repeated, and a polarizing plate and an optical film were produced. And, similar method as in Example was repeated to produce a liquid crystal display. In this liquid crystal display, a contrast ratio in a direction of gradient to make 70 degree from normal was measured in a direction to make an angle of 45 degrees to optical axes perpendicular to each other of polarizing plates to obtain a contrast ratio of 55. FIG. 7 shows a small color shift and excellent optical characteristics. And, after this liquid crystal display was maintained under condition of 60° C. and 95% RH for 200 hours, irregularity within a surface of black viewing was confirmed by visual viewing, and irregularity was hardly observed.

Example 5

(Retardation Film)

The following two kinds of retardation films (a) and (b) were produced by stretching a polycarbonate film. The retardation film (a) had a thickness of 65 µm, an in-plane retardation $Re_1$ of 270 nm and an Nz of 0.8. The retardation film (b) had a thickness of 65 µm, an in-plane retardation $Re_1$ of 270 nm and an Nz of 0.15.

Figure 8:
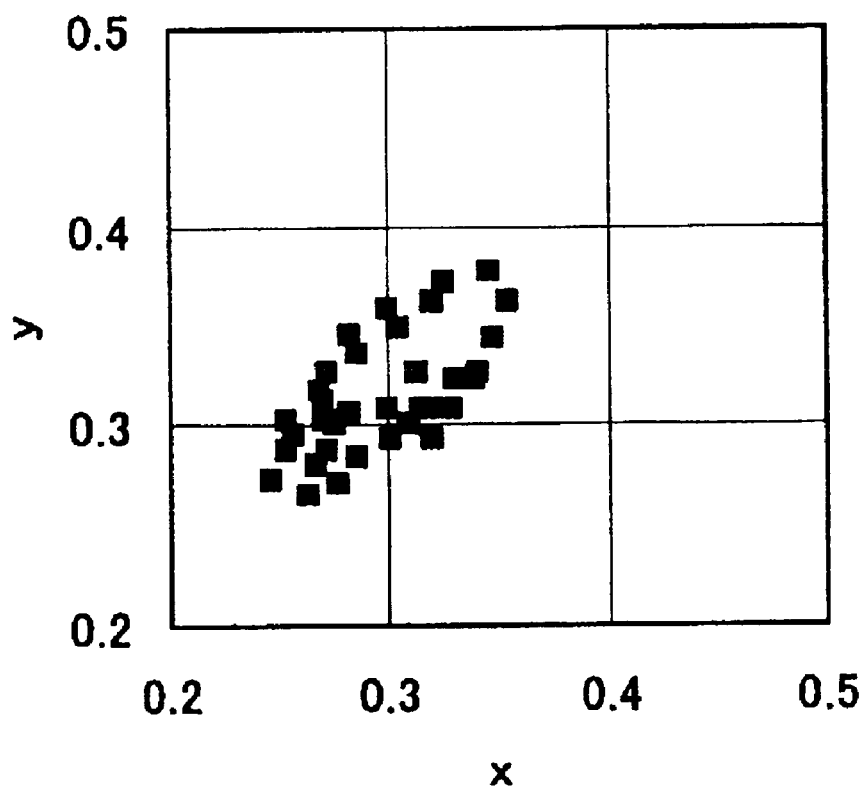
FIG. 8 is a graph showing a color shift of Example 5.

Except that the above retardation films (a) and (b) were used, similar method as in Example 1 was repeated, and an optical film was produced. And, similar method as in Example was repeated to produce a liquid crystal display. In this liquid crystal display, a contrast ratio in a direction of gradient to make 70 degree from normal was measured in a direction to make an angle of 45 degrees to optical axes perpendicular to each other of polarizing plates to obtain a contrast ratio of 35. FIG. 8 shows a color shift. And, after this liquid crystal display was maintained under condition of 60° C. and 95% RH for 200 hours, irregularity within a surface of black viewing was confirmed by visual viewing, and irregularity was hardly observed.

Example 6

(Retardation Film)

The following two kinds of retardation films (a) and (b) were produced by stretching a polycarbonate film. The retardation film (a) had a thickness of 65 µm, an in-plane retardation $Re_1$ of 260 nm and an Nz of 0.75. The retardation film (b) had a thickness of 65 µm, an in-plane retardation $Re_1$ of 260 nm and an Nz of 0.4.

Figure 9:
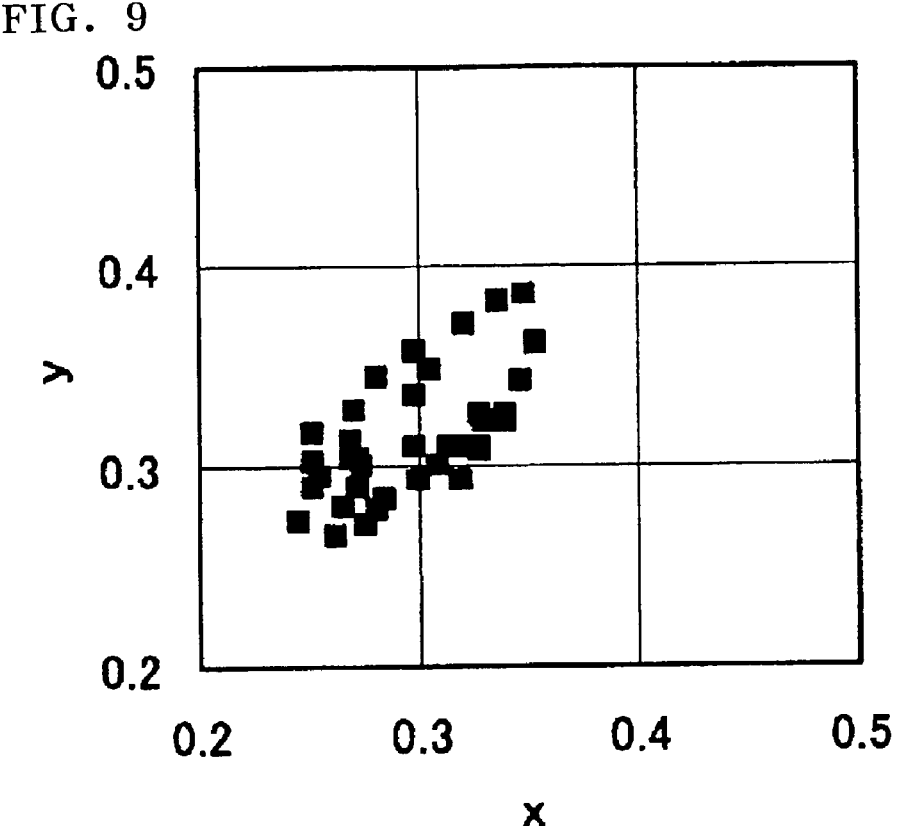
FIG. 9 is a graph showing a color shift of Example 6.

Except that the above retardation films (a) and (b) were used, similar method as in Example 1 was repeated, and an optical film was produced. And, similar method as in Example was repeated to produce a liquid crystal display. In this liquid crystal display, a contrast ratio in a direction of gradient to make 70 degree from normal was measured in a direction to make an angle of 45 degrees to optical axes perpendicular to each other of polarizing plates to obtain a contrast ratio of 35. FIG. 9 shows a color shift. And, after this liquid crystal display was maintained under condition of 60° C. and 95% RH for 200 hours, irregularity within a surface of black viewing was confirmed by visual viewing, and irregularity was hardly observed.

Comparative Example 1

A triacetyl cellulose film, as a transparent protective film, was laminated to both sides of a film (polarizer: 20 µm) in which iodine was absorbed to a poly vinylalcohol based film and subsequently stretched using an adhesive and a polarizing plate was produced. The triacetyl cellulose film showed a thickness of 80 µm, an in-plane retardation $Re_2$ of 4 nm, and thickness direction retardation Rth of 45 nm.

The polarizing plate was laminated to both sides of a liquid crystal cell in IPS mode as in Example 1 using a pressure sensitive adhesive to produce a liquid crystal display. And polarizing plates arranged on both sides of the liquid crystal cell were arranged so that polarization axes were perpendicular to each other.

Figure 10:
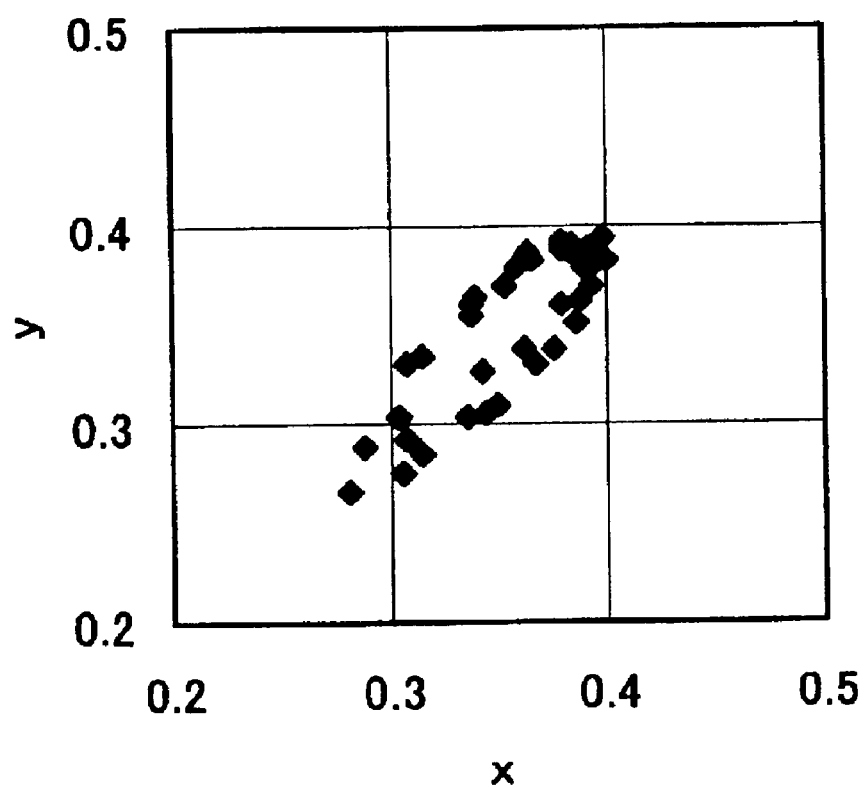
FIG. 10 is a graph showing a color shift of Comparative Example 1.

In this liquid crystal display, a contrast ratio in a direction of gradient to make 70 degree from normal was measured in a direction to make an angle of 45 degrees to optical axes perpendicular to each other of polarizing plates to obtain a contrast ratio of 9. FIG. 10 shows a color shift.

Comparative Example 2

A similar polarizing plate used in Example 1 was laminated to both sides of a similar liquid crystal cell in IPS mode as in Example 1 using a pressure sensitive adhesive to produce a liquid crystal display. And polarizing plates arranged on both sides of the liquid crystal cell were arranged so that polarization axes were perpendicular to each other.

Figure 11:
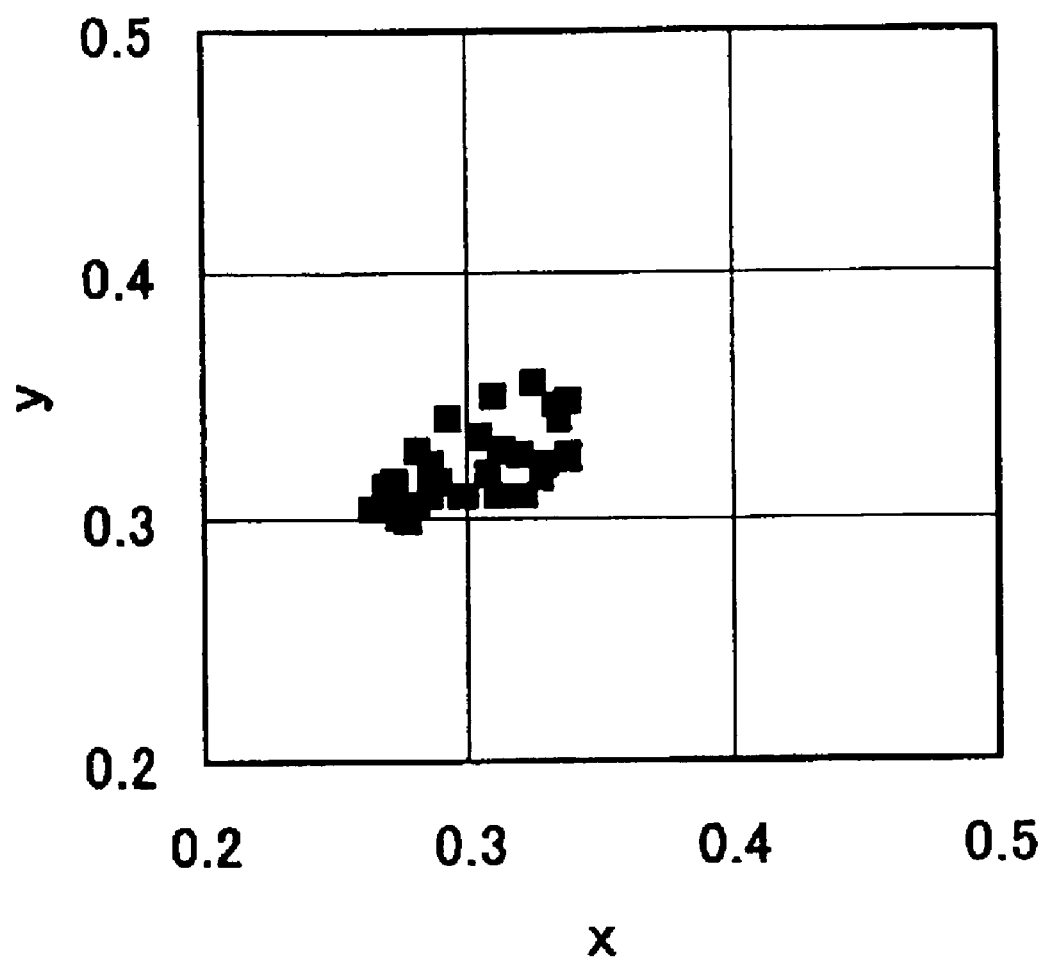
FIG. 11 is a graph showing a color shift of Comparative Example 2.

In this liquid crystal display, a contrast ratio in a direction of gradient to make 70 degree from normal was measured in a direction to make an angle of 45 degrees to optical axes perpendicular to each other of polarizing plates to obtain a contrast ratio of 6. FIG. 11 shows a color shift.

Comparative Example 3

A retardation film having an in-plane retardation of 100 nm and an Nz of 0.5, obtained by stretching a polycarbonate film, was laminated to a polarizing plate obtained in Example 1 using a pressure sensitive adhesive so that a slow axis of the retardation film and an absorption axis of the polarizing plate were parallel to produce an optical film. The optical film thus produced was laminated using a pressure sensitive adhesive so that a retardation film side was arranged on a face of a viewing side of the liquid crystal cell in IPS mode, as in Example 1. On the other hand, a polarizing plate used in Example 1 was laminated to an opposite side using a pressure sensitive adhesive to produce a liquid crystal display.

In this liquid crystal display, a contrast ratio in a direction of gradient to make 70 degree from normal was measured in a direction to make an angle of 45 degrees to optical axes perpendicular to each other of polarizing plates to obtain a contrast ratio of 15.

Comparative Example 4

A retardation film having an in-plane retardation of 260 nm and an Nz of 1.0, obtained by stretching a polycarbonate film, was laminated to a polarizing plate obtained in Example 1 using a pressure sensitive adhesive so that a slow axis of the retardation film and an absorption axis of the polarizing plate were parallel to produce an optical film. The optical film thus produced was laminated using a pressure sensitive adhesive so that a retardation film side was arranged on a face of a viewing side of the liquid crystal cell in IPS mode, as in Example 1. On the other hand, a polarizing plate used in Example 1 was laminated to an opposite side using a pressure sensitive adhesive to produce a liquid crystal display.

In this liquid crystal display, a contrast ratio in a direction of gradient to make 70 degree from normal was measured in a direction to make an angle of 45 degrees to optical axes perpendicular to each other of polarizing plates to obtain a contrast ratio of 8.

Comparative Example 5

A retardation film having an in-plane retardation of 120 nm and an Nz of 1.0, obtained by stretching a polycarbonate film, was laminated to a polarizing plate made in Example 1 using a pressure sensitive adhesive so that a slow axis of the retardation film and an absorption axis of the polarizing plate were parallel to produce an optical film. The optical film thus produced was laminated using a pressure sensitive adhesive so that a retardation film side was arranged on a face of a viewing side of the liquid crystal cell in IPS mode, as in Example 1. On the other hand, a polarizing plate used in Example 1 was laminated to an opposite side using a pressure sensitive adhesive to produce a liquid crystal display.

In this liquid crystal display, a contrast ratio in a direction of gradient to make 70 degree from normal was measured in a direction to make an angle of 45 degrees to optical axes perpendicular to each other of polarizing plates to obtain a contrast ratio of 8.

Referential Example 1

A triacetyl cellulose film, as a transparent protective film, was laminated to both sides of a film (polarizer: 20 μm) in which iodine was absorbed to a poly vinylalcohol based film and subsequently stretched, using an adhesive, and a polarizing plate was produced. The retardation films (a, b) made of polycarbonate obtained in Example 1 were laminated to the polarizing plate concerned, using a pressure sensitive adhesive, so that a slow axis of the retardation films (a, b) and an absorption axis of the polarizing plate were parallel to produce an optical film. The optical film thus produced was laminated, using a pressure sensitive adhesive, so that a retardation film side was arranged on a face of a viewing side of the liquid crystal cell in IPS mode, as in Example 1. On the other hand, a polarizing plate used in Example 1 was laminated to an opposite side using a pressure sensitive adhesive to produce a liquid crystal display.

In this liquid crystal display, a contrast ratio in a direction of gradient to make 70 degree from normal was measured in a direction to make an angle of 45 degrees to optical axes perpendicular to each other of polarizing plates to obtain a contrast ratio of 4. And, after this liquid crystal display was maintained under condition of 60° C. and 95% RH for 200 hours, irregularity within a surface of black viewing was confirmed by visual viewing, and irregularity by variation of a retardation value of the retardation film caused by shrink of the polarizing plate was observed.

INDUSTRIAL APPLICABILITY

The optical film of the invention relates, in which a polarizing plate and plural retardation films are laminated, is suitable an image viewing display, such as a liquid crystal display, a PDP, and a CRT. Especially the optical film of the invention is preferably used for a liquid crystal display operating in IPS mode.

The invention claimed is:

1. A liquid crystal display in IPS mode,
wherein an optical film is arranged on a cell substrate on a viewing side,
a polarizing plate comprising a transparent protective film laminated on both sides of a polarizer is arranged on a cell substrate opposite to the viewing side, and
an extraordinary refractive index direction of a liquid crystalline substance in a liquid crystal cell and an absorption axis of the polarizing plate are parallel, in a state where voltage is not applied,
wherein the optical film is a laminate in which plural retardation films are laminated on one side of a polarizing plate obtained by laminating a transparent protective film on both sides of a polarizer so that a retardation film (a) and a retardation film (b) are laminated in this order from the polarizing plate side so that the slow axes of the plural retardation films are parallel to one another and the absorption axis of the polarizing plate is parallel to the slow axes of the two retardation films,
an Nz value expressed by $Nz=(nx_1-nz_1)/(nx_1-ny_1)$ is in the range of from 0.72 to 0.78 for the retardation film (a) and in the range of from 0.22 to 0.28 for retardation film (b), and
an in-plane retardation $Re_1$ expressed by $Re_1=(nx_1-ny_1)\times d_1$ is in the range of from 200 to 350 nm,
where in each of the plural retardation films, a direction along with the refractive index in the film plane is maximum is defined as the X-axis, a direction perpendicular to the X-axis as the Y-axis, the thickness direction of the film as the Z-axis, and where refractive indices in each axial direction are defined as $nx_1$, $ny_1$, and $nz_1$, respectively, and the thickness of the film as $d_1$ (nm),
wherein
the transparent protective film laminated on at least one side of the polarizing plate comprises a thermoplastic resin (A) having a substituted and/or non-substituted imide group in a side chain and a thermoplastic resin (B) having substituted and/or non-substituted phenyl group, and nitrile group in a side chain; and
wherein
an in-plane retardation expressed by $Re_2=(nx_2-ny_2)\times d_2$ is 20 nm or less, and
a thickness direction retardation expressed by $Rth=\{(nx_2+ny_2)/2-nz_2\}\times d_2$ is 30 nm or less,
where in the transparent protective film laminated on at least one side of the polarizing plate, a direction along with the refractive index in the film plane is maximum is defined as the X-axis, a direction perpendicular to the X-axis as the Y-axis, the thickness direction of the film as the Z-axis, and where refractive indices in each axial direction are defined as $nx_2$, $ny_2$, and $nz_2$, respectively, and the thickness of the film as $d_2$ (nm),
and wherein the optical film is arranged so that the retardation films are laminated on the liquid crystal cell-side of the polarizing plate.

2. The liquid crystal display according to claim 1, wherein the transparent protective film laminated on at least one side of the polarizing plate comprises a thermoplastic resin (A) having a substituted and/or non-substituted imide group in a side chain and a thermoplastic resin (B) having a substituted and/or non-substituted phenyl group, and a nitrile group in a side chain.

3. The liquid crystal display according to claim 1, wherein an in-plane retardation expressed by $Re_2=(nx_2-ny_2)\times d_2$ is 20 nm or less, and a thickness direction retardation expressed by Rth={$(nx_2+ny_2)/2-nz_2$}$\times d_2$ is 30 nm or less,
where in the transparent protective film laminated on at least one side of the polarizing plate, a direction along with the refractive index in the film plane is maximum is defined as the X-axis, a direction perpendicular to the X-axis as the Y-axis, the thickness direction of the film as the Z-axis, and where refractive indices in each axial direction are defined as $nx_2$, $ny_2$, and $nz_2$, respectively, and the thickness of the film as $d_2$ (nm).

4. The liquid crystal display according to claim 1, wherein the transparent protective film is a film that is treated by stretching process.

5. The liquid crystal display according to claim 1, wherein, in the optical film, the absolute value of a difference in Nz value between the retardation film (a) and the retardation film (b) is in the range of from 0.4 to 0.6.

6. The liquid crystal display according to claim 1, wherein, in the optical film, the transparent protective film is a film that is treated by stretching process.

7. A liquid crystal display in IPS mode,
wherein a polarizing plate comprising a transparent protective film laminated on both sides of a polarizer is arranged on a cell substrate on a viewing side,
an optical film is arranged on a cell substrate opposite to the viewing side, and
an extraordinary refractive index direction of a liquid crystalline substance in a liquid crystal cell and an absorption axis of the optical film are perpendicular, in a state where voltage is not applied,
wherein the optical film is a laminate in which plural retardation films are laminated on one side of a polarizing plate obtained by laminating a transparent protective film on both sides of a polarizer so that a retardation film (a) and a retardation film (b) are laminated in this order from the polarizing plate side so that the slow axes of the plural retardation films are parallel to one another and the absorption axis of the polarizing plate is parallel to the slow axes of the two retardation films,
an Nz value expressed by Nz=$(nx_1-nz_1)/(nx_1-ny_1)$ is in the range of from 0.72 to 0.78 for the retardation film (a) and in the range of from 0.22 to 0.28 for retardation film (b), and
an in-plane retardation $Re_1$ expressed by $Re_1$=$(nx_1-ny_1)\times d_1$ is in the range of from 200 to 350 nm,
where in each of the plural retardation films, a direction along with the refractive index in the film plane is maximum is defined as the X-axis, a direction perpendicular to the X-axis as the Y-axis, the thickness direction of the film as the Z-axis, and where refractive indices in each axial direction are defined as $nx_1$, $ny_1$, and $nz_1$, respectively, and the thickness of the film as $d_1$ (nm),
wherein
the transparent protective film laminated on at least one side of the polarizing plate comprises a thermoplastic resin (A) having a substituted and/or non-substituted imide group in a side chain and a thermoplastic resin (B) having substituted and/or non-substituted phenyl group, and nitrile group in a side chain; and
wherein
an in-plane retardation expressed by $Re_2$=$(nx_2-ny_2)\times d_2$ is 20 nm or less, and
a thickness direction retardation expressed by Rth={$(nx_2+ny_2)/2-nz_2$}$\times d_2$ is 30 nm or less,
where in the transparent protective film laminated on at least one side of the polarizing plate, a direction along with the refractive index in the film plane is maximum is defined as the X-axis, a direction perpendicular to the X-axis as the Y-axis, the thickness direction of the film as the Z-axis, and where refractive indices in each axial direction are defined as $nx_2$, $ny_2$, and $nz_2$ respectively, and the thickness of the film as $d_2$ (nm),
and wherein the optical film is arranged so that the retardation films are laminated on the liquid crystal cell-side of the polarizing plate.

8. The liquid crystal display according to claim 7, wherein the transparent protective film laminated on at least one side of the polarizing plate comprises a thermoplastic resin (A) having a substituted and/or non-substituted imide group in a side chain and a thermoplastic resin (B) having a substituted and/or non-substituted phenyl group, and a nitrile group in a side chain.

9. The liquid crystal display according to claim 7, wherein an in-plane retardation expressed by $Re_2$=$(nx_2-ny_2)\times d_2$ is 20 nm or less, and
a thickness direction retardation expressed by Rth={$(nx_2+ny_2)/2-nz_2$}$\times d_2$ is 30 nm or less,
where in the transparent protective film laminated on at least one side of the polarizing plate, a direction along with the refractive index in the film plane is maximum is defined as the X-axis, a direction perpendicular to the X-axis as the Y-axis, the thickness direction of the film as the Z-axis, and where refractive indices in each axial direction are defined as $nx_2$, $ny_2$, and $nz_2$, respectively, and the thinkness of the film as $d_2$ (nm).

10. The liquid crystal display according to claim 7, wherein the transparent protective film is a film that is treated by stretching process.

11. The liquid crystal display according to claim 7, wherein, in the optical film, the absolute value of a difference in Nz value between the retardation film (a) and the retardation film (b) is in the range of from 0.4 to 0.6.

12. The liquid crystal display according to claim 7, wherein, in the optical film, the transparent protective film is a film that is treated by stretching process.

13. A liquid crystal display in IPS mode,
wherein an optical film is arranged on a cell substrate on a viewing side,
a polarizing plate comprising a transparent protective film laminated on both sides of a polarizer is arranged on a cell substrate opposite to the viewing side, and
an extraordinary refractive index direction of a liquid crystalline substance in a liquid crystal cell and an absorption axis of the polarizing plate are parallel, in a state where voltage is not applied,
wherein the optical film is a laminate in which the plural retardation films are laminated on one side of the polarizing plate obtained by laminating a transparent protective film on both sides of a polarizer so that a retardation film (b) and a retardation film (a) are laminated in this order from the polarizing plate side so that the slow axes of the plural retardation films are parallel to one another and the absorption axis of the polarizing plate is perpendicular to the slow axes of the two retardation films,
wherein
an Nz value expressed by Nz=$(nx_1-nz_1)/nx_1-ny_1)$ is in the range of from 0.72 to 0.78 for the retardation film (a) and in the range of from 0.22 to 0.28 for the retardation film (b) and
an in-plane retardation $Re_1$ expressed by $Re_1$=$(nx_1-nz_1)\times d_1$ is in the range of from 200 to 350 nm,
where in each of the plural retardation films, a direction along with the refractive index in the film plane is maximum is defined as the X-axis, a direction perpendicular to the X-axis as the Y-axis, the thickness direction of the film as the Z-axis, and where refractive indices in each axial direction are defined as $nx_1$, $ny_1$, and $nz_1$, respectively, and the thickness of the film as $d_1$ (nm), wherein the transparent protective film laminated on at least one side of the polarizing plate comprises a thermoplastic resin (A) having a substituted and/or non-substituted imide group in a side chain and a thermoplastic resin (B) having substituted and/or non-substituted phenyl group, and nitrile group in a side chain, wherein an in-plane retardation expressed by $Re_2=(nx_2-ny_2)\times d_2$ is 20 nm or less, and a thickness direction retardation expressed by $Rth=\{(nx_2+ny_2)/2-nz_2\}\times d_2$ is 30 nm or less, where in the transparent protective film laminated on at least one side of the polarizing plate, a direction along with the refractive index in the film plane is maximum is defined as the X-axis, a direction perpendicular to the X-axis as the Y-axis, the thickness direction of the film as the Z-axis, and where refractive indices in each axial direction are defined as $nx_2$, $ny_2$, and $nz_2$, respectively, and the thickness of the film as $d_2$ (nm), and wherein the optical film is arranged so that the retardation films are laminated on the liquid crystal cell-side of the polarizing plate.

14. The liquid crystal display according to claim 13, wherein the transparent protective film laminated on at least one side of the polarizing plate comprises a thermoplastic resin (A) having a substituted and/or non-substituted imide group in a side chain and a thermoplastic resin (B) having a substituted and/or non-substituted phenyl group, and a nitrile group in a side chain.

15. The liquid crystal display according to claim 13, wherein an in-plane retardation expressed by $Re_2=(nx_2-ny_2)\times d_2$ is 20 nm or less, and a thickness direction retardation expressed by $Rth=\{(nx_2+ny_2)/2-nz_2\}\times d_2$ is 30 nm or less, where in the transparent protective film laminated on at least one side of the polarizing plate, a direction along with the refractive index in the film plane is maximum is defined as the X-axis, a direction perpendicular to the X-axis as the Y-axis, the thickness direction of the film as the Z-axis, and where refractive indices in each axial direction are defined as $nx_2$, $ny_2$, and $nz_2$, respectively, and the thickness of the film as $d_2$ (nm).

16. The liquid crystal display according to claim 13, wherein the transparent protective film is a film that is treated by stretching process.

17. The optical film according to claim 15, wherein the absolute value of a difference in Nz value between the retardation film (a) and the retardation film (b) is in the range of from 0.4 to 0.6.

18. The optical film according to claim 13, wherein the transparent protective film is a film that is treated by stretching process.

19. A liquid crystal display in IPS mode, wherein a polarizing plate comprising a transparent protective film laminated on both sides of a polarizer is arranged on a cell substrate on a viewing side, an optical film is arranged on a cell substrate opposite to the viewing side, and an extraordinary refractive index direction of a liquid crystalline substance in a liquid crystal cell and an absorption axis of the optical film are perpendicular, in a state where voltage is not applied, wherein the optical film is a laminate in which the plural retardation films are laminated on one side of the polarizing plate obtained by laminating a transparent protective film on both sides of a polarizer so that a retardation film (b) and a retardation film (a) are laminated in this order from the polarizing plate side so that the slow axes of the plural retardation films are parallel to one another and the absorption axis of the polarizing plate is perpendicular to the slow axes of the two retardation films, wherein an Nz value expressed by $Nz=(nx_1-nz_1)/nx_1-ny_1)$ is in the range of from 0.72 to 0.78 for the retardation film (a) and in the range of from 0.22 to 0.28 additional for the retardation film (b) and an in-plane retardation $Re_1$ expressed by $Re_1=(nx_1-ny_1)\times d_1$ is in the range of from 200 to 300 nm, where in each of the plural retardation films, a direction along with the refractive index in the film plane is maximum is defined as the X-axis, a direction perpendicular to the X-axis as the Y-axis, the thickness direction of the film as the Z-axis, and where refractive indices in each axial direction are defined as $nx_1$, $ny_1$, and $nz_1$, respectively, and the thickness of the film as $d_1$ (nm), wherein the transparent protective film laminated on at least one side of the polarizing plate comprises a thermoplastic resin (A) having a substituted and/or non-substituted imide group in a side chain and a thermoplastic resin (B) having substituted and/or non-substituted phenyl group, and nitrile group in a side chain, wherein an in-plane retardation expressed by $Re_2=(nx_2-ny_2)\times d_2$ is 20 nm or less, and a thickness direction retardation expressed by $Rth=\{(nx_2+ny_2)/2-nz_2\}\times d_2$ is 30 nm or less, where in the transparent protective film laminated on at least one side of the polarizing plate, a direction along with the refractive index in the film plane is maximum is defined as the X-axis, a direction perpendicular to the X-axis as the Y-axis, the thickness direction of the film as the Z-axis, and where refractive indices in each axial direction are defined as $nx_2$, $ny_2$, and $nz_2$, respectively, and the thickness of the film as $d_2$ (nm), and wherein the optical film is arranged so that the retardation films are laminated on the liquid crystal cell-side of the polarizing plate.

20. The liquid crystal display according to claim 19, wherein the transparent protective film laminated on at least one side of the polarizing plate comprises a thermoplastic resin (A) having a substituted and/or non-substituted imide group in a side chain and a thermoplastic resin (B) having a substituted and/or non-substituted phenyl group, and a nitrile group in a side chain.

21. The liquid crystal display according to claim 19, wherein an in-plane retardation expressed by $Re_2=(nx_2-ny_2)\times d_2$ is 20 nm or less, and a thickness direction retardation expressed by $Rth=\{(nx_2+ny_2)/2-nz_2\}\times d_2$ is 30 nm or less, where in the transparent protective film laminated on at least one side of the polarizing plate, a direction along with the refractive index in the film plane is maximum is defined as the X-axis, a direction perpendicular to the X-axis as the Y-axis, the thickness direction of the film as the Z-axis, and where refractive indices in each axial direction are defined as $nx_2$, $ny_2$, and $nz_2$, respectively, and the thickness of the film as $d_2$ (nm).

22. The liquid crystal display according to claim 19, wherein the transparent protective film is a film that is treated by stretching process.

23. The optical film according to claim 19, wherein the absolute value of a difference in Nz value between the retardation film (a) and the retardation film (b) is in the range of from 0.4 to 0.6.

24. The optical film according to claim 19, wherein the transparent protective film is a film that is treated by stretching process.

* * * * *